(12) United States Patent
Harada et al.

(10) Patent No.: US 11,413,838 B2
(45) Date of Patent: Aug. 16, 2022

(54) PRESS MACHINE AND METHOD OF SETTING OPERATION FOR PRESS MACHINE

(71) Applicant: AIDA ENGINEERING, LTD., Kanagawa (JP)

(72) Inventors: Yasuhiro Harada, Sagamihara (JP); Shintaro Bando, Ebina (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 113 days.

(21) Appl. No.: 16/855,930

(22) Filed: Apr. 22, 2020

(65) Prior Publication Data
US 2020/0338849 A1 Oct. 29, 2020

(30) Foreign Application Priority Data
Apr. 26, 2019 (JP) .............................. JP2019-085139

(51) Int. Cl.
*B30B 15/14* (2006.01)
*G05B 19/4068* (2006.01)

(52) U.S. Cl.
CPC ........ *B30B 15/148* (2013.01); *G05B 19/4068* (2013.01); *G05B 2219/35077* (2013.01);
(Continued)

(58) Field of Classification Search
CPC ............ G05B 19/4068; G05B 19/4069; G05B 2219/35077; G05B 2219/35287;
(Continued)

(56) References Cited

U.S. PATENT DOCUMENTS

| 5,267,463 A | 12/1993 | Doyama |
| 5,732,619 A * | 3/1998 | Hata ...................... B30B 15/00 100/341 |
| 8,726,802 B2 | 5/2014 | Senda et al. |
| 8,972,055 B1 * | 3/2015 | Desai ...................... B25J 13/06 700/250 |

(Continued)

FOREIGN PATENT DOCUMENTS

| EP | 1820580 A1 * | 8/2007 | ........... B30B 15/146 |
| EP | 1820580 A1 | 8/2007 | |

(Continued)

OTHER PUBLICATIONS

Stamtec OmniLink Press Control Display, Retrieved from Wayback Machine 17 December, 1 Page. (Year: 2017).*

(Continued)

*Primary Examiner* — Gregory D Swiatocha
(74) *Attorney, Agent, or Firm* — McDermott Will & Emery LLP

(57) ABSTRACT

A press machine includes a display unit which displays a first image in a circular shape corresponding to a rotation of an eccentric mechanism and representing one stroke of slide operation and a second image in a circular-arc shape corresponding to an operation of an attachment device interlocked with the press machine, and an operation unit which receives an input operation. The first image indicates at least one slide operation region. The second image is placed concentrically with the first image in relation to the slide operation region. The second image has opposed ends each allowed to move in response to the input operation in a direction in which the second image extends.

21 Claims, 14 Drawing Sheets

(52) U.S. Cl.
CPC .............. *G05B 2219/35287* (2013.01); *G05B 2219/35313* (2013.01); *G05B 2219/35317* (2013.01); *G05B 2219/35514* (2013.01)

(58) Field of Classification Search
CPC ........... G05B 2219/35313; G05B 2219/35317; G05B 2219/35514
See application file for complete search history.

(56) References Cited

U.S. PATENT DOCUMENTS

| | | |
|---|---|---|
| 2009/0217724 A1 | 9/2009 | Basga et al. |
| 2013/0104613 A1* | 5/2013 | Kaneko ................ B30B 15/148 72/20.5 |
| 2013/0317637 A1 | 11/2013 | Singh et al. |
| 2616/0320764 | 11/2018 | Ogawa et al. |
| 2019/0291375 A1 | 9/2019 | Harada |

FOREIGN PATENT DOCUMENTS

| | | |
|---|---|---|
| EP | 2082868 A2 | 7/2009 |
| JP | S48-054374 U | 7/1973 |
| JP | H05-092228 A | 4/1993 |
| JP | 7-29224 B2 | 4/1995 |
| JP | H07-290295 A | 11/1995 |
| JP | 9-225696 | 9/1997 |
| JP | 2000-167697 A | 6/2000 |
| JP | 2001-096329 A | 4/2001 |
| JP | 2004-58152 A | 2/2004 |
| JP | D1608486 S | 7/2018 |
| JP | D1608825 S | 7/2018 |
| JP | 2019-166552 A | 10/2019 |

OTHER PUBLICATIONS

Komatsu Technical Report, Retrieved Dec. 14, 2021, 8 Pages. (Year: 2007).*
Entire prosecution history of Design U.S. Appl. No. 29/648,936, which corresponds to JP-D1608825 and JP-D1608486.
Extended European Search Report issued in corresponding European Patent Application No. 20170146.3, dated Sep. 23, 2020.
Office Action from corresponding Japanese Application 2019-085139 dated Mar. 29, 2022, with English translation (5 pages).

* cited by examiner

PRESS MACHINE AND METHOD OF SETTING OPERATION FOR PRESS MACHINE

Japanese Patent Application No. 2019-085139, filed on Apr. 26, 2019, is hereby incorporated by reference in its entirety.

BACKGROUND OF THE INVENTION

The present invention relates to a press machine and a method of setting an operation for a press machine.

For example, a configuration in which an encoder is attached to a crankshaft has been well known as a method of detecting the position of a slide (a crank angle) in a press machine. There is also a well-known timing switch for a press machine which outputs a timing signal for activating (turning on) or deactivating (turning off) an attachment device (including equipment or an attachment device mounted on the press body and an external peripheral device) using outputs from the encoder. For example, JP-A-9-225696 discloses a timing switch using outputs from an encoder. According to the disclosure of JP-A-2004-58152, a timing switch for the start and end of operation is displayed in a table form at an interface and numerical values are input to the table as a method of setting a timing switch related to activation or deactivation operation of an attachment device.

In setting an operation for such an attachment device, the operator may find it difficult to intuitively imagine the positional relation between slide motion and the operation of the attachment device, which is defined as the slide position for each stroke (time or a crank angle). In particular, a skilled operator may imagine the slide motion as the rotational motion of an eccentric mechanism which drives the slide and set the operation for the attachment device according to its rotational angle. An input result by the conventional table type interface is dependent on the operator's imagination, which may result in different settings from those intended by the operator. Therefore, a higher level of skill is required in setting an operation for a servo press machine which allows slide motion to be arbitrarily changed.

SUMMARY

The present disclosure can provide a press machine which allows an operator to set an operation for an attachment device while visually recognizing the relation between the motion of a slide and the operation of an attachment device after setting and a method of setting an operation for a press machine.

According to a first aspect of the invention, there is provided a press machine performing press working by transforming a rotation of an electric motor into a reciprocating linear motion of a slide by using an eccentric mechanism which transforms a rotational motion into a linear motion, the press machine including:

a display unit which displays a first image in a circular shape corresponding to a rotation of the eccentric mechanism and representing one stroke of slide operation and a second image in a circular-arc shape corresponding to an operation of an attachment device interlocked with the press machine; and an operation unit which receives an input operation, the first image indicating at least one slide operation region, the second image being placed concentrically with the first image in relation to the slide operation region, and the second image having opposed ends each allowed to move in response to the input operation in a direction in which the second image extends.

According to a second aspect of the invention, there is provided a method of setting an operation for a press machine which performs press working by transforming a rotation of an electric motor into a reciprocating linear motion of a slide by using an eccentric mechanism which transforms a rotational motion into a linear motion, the method including:

displaying a first image in a circular shape corresponding to a rotation of the eccentric mechanism displayed at a display unit and representing one stroke of slide operation and a second image in a circular-arc shape placed concentrically with the first image; and setting a range in which an attachment device interlocked with the press machine operates by performing an input operation to the second image.

DETAILED DESCRIPTION OF THE EMBODIMENT

Figure 1:
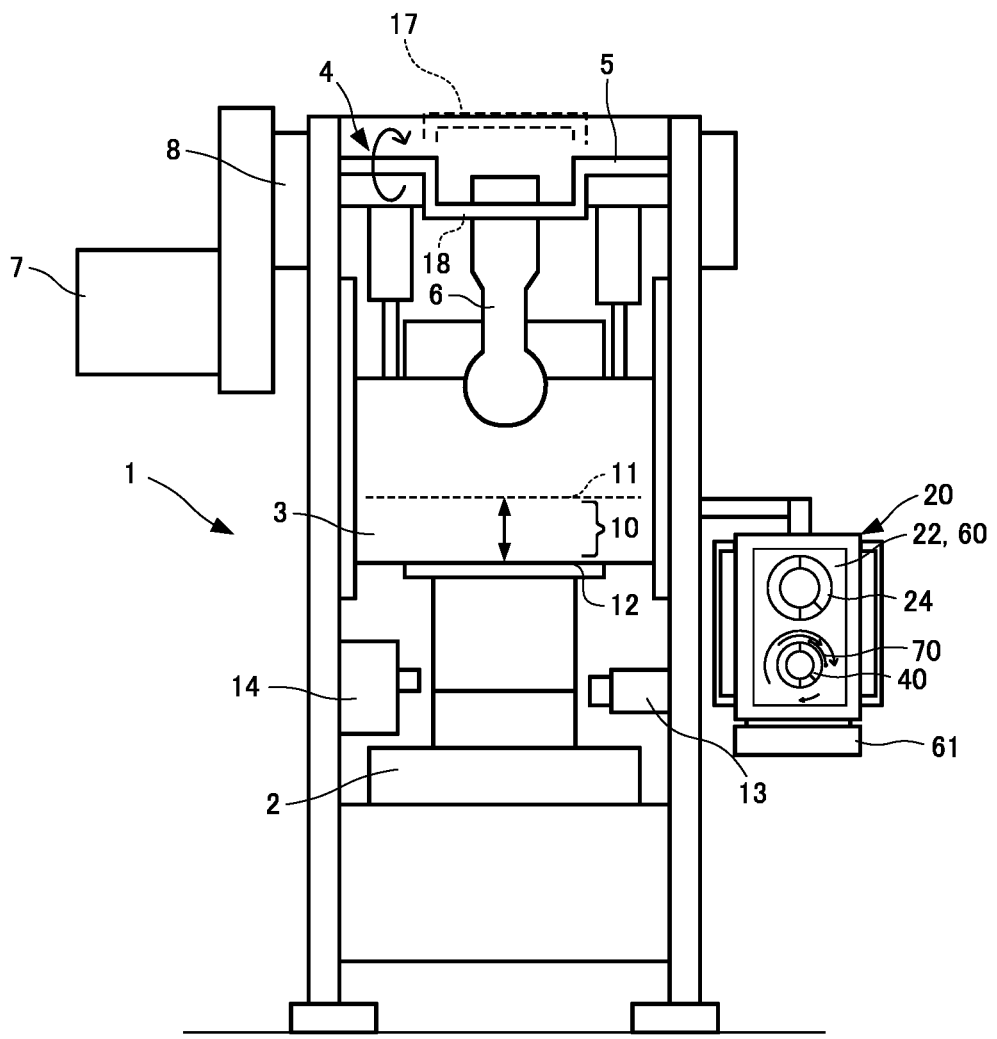
FIG. 1 is a front view illustrating an overview of a press machine according to the embodiment.

The invention has been made to solve at least some of the above-described problems and can be implemented as any of the following application examples.

(1) A press machine according to one embodiment of the invention performs press working by transforming a rotation of an electric motor into a reciprocating linear motion of a slide by using an eccentric mechanism which transforms a rotational motion into a linear motion, the press machine includes:

a display unit which displays a first image in a circular shape corresponding to a rotation of the eccentric mechanism and representing one stroke of slide operation and a second image in a circular-arc shape corresponding to an operation of an attachment device interlocked with the press machine; and an operation unit which receives an input operation, the first image indicates at least one slide operation region, the second image is placed concentrically with the first image in relation to the slide operation region, and the second image has opposed ends each allowed to move in response to the input operation in a direction in which the second image extends.

In the press machine according to the embodiment, operation for the attachment device can be easily set while visually recognizing the relation between slide motion and the operation of the attachment device by the first image in the circular shape and the second image in the circular-arc shape.

(2) In the press machine according to the embodiment, the display unit may display a plurality of the second images arranged concentrically with the first image, and Each of the plurality of second images may correspond to other operation in the attachment device or another attachment device.

In the press machine according to the embodiment, the operator can easily set multiple kinds of operation for the attachment device while visually recognizing the relation between the slide motion and the multiple kinds of operation in the attachment device.

(3) In the press machine according to the embodiment, the second image may be displayed in an arrow shape directed from a starting end to a terminal end, and the arrow may indicate a rotation direction which is identical to a direction in which the eccentric mechanism rotates in the first image.

In the press machine according to the embodiment, the second image is displayed in the arrow shape, so that the operator can set operation for the attachment device while easily recognizing the operation direction of the slide.

(4) In the press machine according to the embodiment, the display unit may display a fourth image representing an operation range by an advance angle at a starting end of the second image.

While the operator cannot easily grasp an advance angle for solving a response delay with respect to an instruction output, the operator can easily set the advance angle based on visual recognition.

(5) In the press machine according to the embodiment, the display unit may display a fifth image representing an operation range by an advance angle side by side with the second image.

While the operator cannot easily grasp an advance angle for solving a response delay with respect to an instruction output, the operator can easily set the advance angle based on visual recognition.

(6) In the press machine according to the embodiment, the display unit may further display a third image in a circular shape, and when the press machine is a servo press machine, a slide motion may be input from the operation unit to the third image, so that the slide motion is reflected on the slide operation region in the first image.

In the press machine according to the embodiment, the operator can easily perform input operation since the operator can grasp slide motion setting, slide motion after the change, and the operation of an attachment device at a glance.

(7) The press machine according to the embodiment may be a servo press machine, the first image may include a pendulum slide operation region corresponding to a pendulum motion of the eccentric mechanism, and when at least one of the opposed ends of the second image is set in a region other than the pendulum slide operation region, the display unit may indicate that the attachment device corresponding to the second image is in an erroneous state.

In the press machine according to the embodiment, when the attachment device is set in a range in which the slide does not operate, the operator can understand that the attachment device is set in the erroneous state only by looking at the display unit.

(8) A method of setting operation for a press machine according to one embodiment of the invention is a method of setting an operation for a press machine which performs press working by transforming a rotation of an electric motor into a reciprocating linear motion of a slide by using an eccentric mechanism which transforms a rotational motion into a linear motion, the method includes:

displaying a first image in a circular shape corresponding to a rotation of the eccentric mechanism displayed at a display unit and representing one stroke of slide operation and a second image in a circular-arc shape placed concentrically with the first image; and setting a range in which an attachment device interlocked with the press machine operates by performing an input operation to the second image.

In the method of setting operation for a press machine according to the embodiment, operation for the attachment device can easily be set while the relation between slide motion and the operation of the attachment device is visually recognized by the first image in the circular shape and the second image in the circular arc shape.

According to the press machine and the method of setting an operation for the press machine, the operator can easily set operation for an attachment device while visually recognizing the relation between the slide motion and the operation of the attachment device.

Preferred embodiments of the invention are described in detail below with reference to the drawings. Note that the following embodiments do not unduly limit the scope of the invention as stated in the claims. In addition, all of the elements described below are not necessarily essential requirements of the invention.

1. Press Machine

Figure 2:
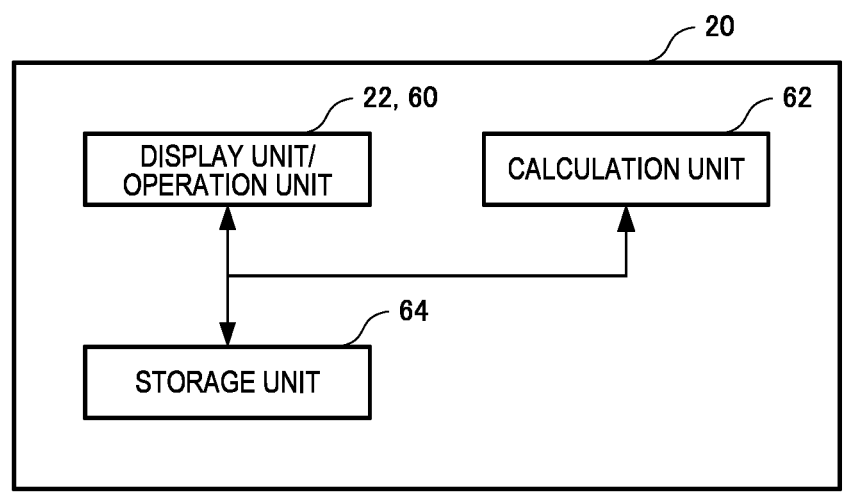
FIG. 2 is a block diagram illustrating the control panel of the press machine according to the embodiment.
Figure 3:
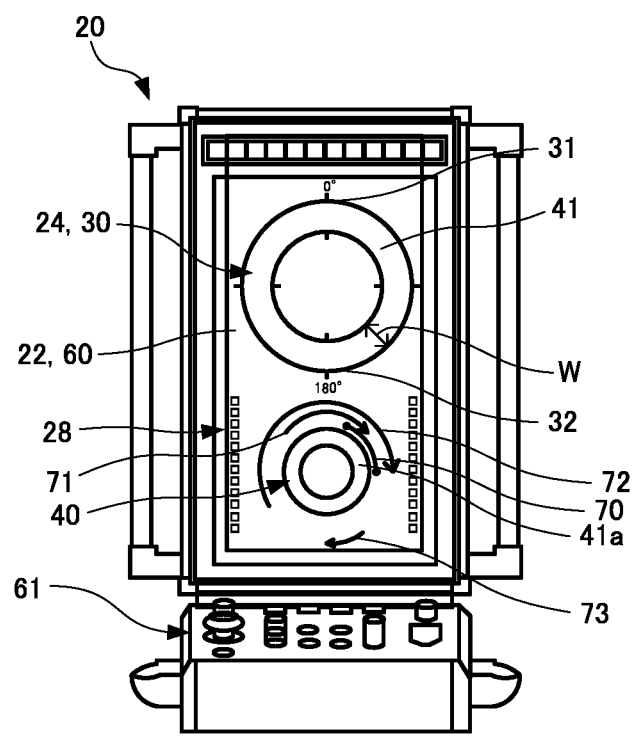
FIG. 3 is a front view of the control panel of the press machine according to the embodiment.
Figure 4:
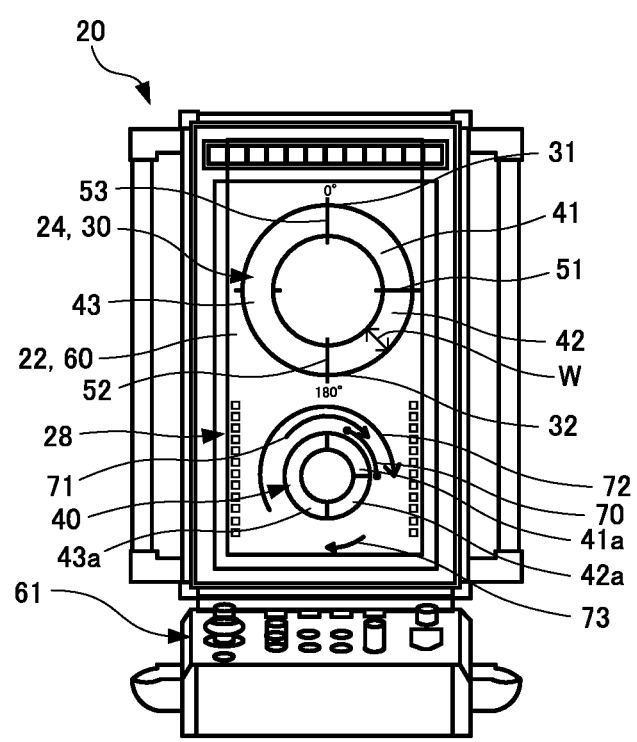
FIG. 4 is a front view of the control panel when the press machine according to the embodiment is a servo press machine.

With reference to FIGS. 1 to 4, an overall structure of a press machine (hereinafter referred to as the "press machine 1") will be described. FIG. 1 is a front view illustrating an overview of the press machine 1 according to the embodiment, FIG. 2 is a block diagram illustrating the control panel 20 of the press machine 1, FIG. 3 is a front view of the control panel 20 of the press machine 1, and FIG. 4 is a front view of the control panel 20 when the press machine 1 is a servo press machine.

1-1. Overall Structure of Press Machine

As illustrated in FIG. 1, the press machine 1 performs press working by transforming the rotation of an electric motor 7 into the reciprocating linear motion of a slide 3 by an eccentric mechanism 4 which transforms rotational motion into linear motion.

The press machine 1 includes the eccentric mechanism 4 having a crankshaft 5 and a connecting rod 6, the electric motor 7 which drives the eccentric mechanism 4, a deceleration mechanism 8 which connects between the eccentric mechanism 4 and the electric motor 7, and a control panel 20 for making various settings for the press machine 1 and operating the machine. The press machine 1 may be a servo press machine or a mechanical press machine for example including an addition clutch and a flywheel which are not shown.

The electric motor 7 is an induction motor. The electric motor 7 may also be a reluctance motor, an AC servo motor, or a DC servo motor instead of the induction motor.

The eccentric mechanism 4 may be a crank mechanism having an eccentric shaft instead of the crank mechanism using the crankshaft 5. The eccentric mechanism 4 may be a force doubling mechanism including a known slide drive mechanism used in the press machine 1 such as a knuckle mechanism and a link mechanism. A mechanism having an eccentric plate integrated with the main gear can also be used. The crankshaft 5 is driven by the electric motor 7 to rotate between the top dead center 17 (denoted by the dashed line in FIG. 1) and the bottom dead center 18.

A mold is fixed to each of a bolster 2 and a slide 3. The slide 3 connected to a lower end of the connecting rod 6 moves up and down with respect to the bolster 2 as the crankshaft 5 is driven by the electric motor 7. The moving range 10 in which the slide 3 moves up and down vertically is in the range between the ascending limit 11 (denoted by the dashed line in FIG. 1) and the descending limit 12.

The press machine 1 is provided with one or more attachment devices. The attachment device is interlocked with the press machine 1. The attachment device may include an ejector which ejects a product remaining in the mold to the outside, an oil spraying device which sprays the product with oil, and a feeding device which feeds a material into the mold. The attachment device starts or ends operation for example in response to a timing switch set at the press machine 1. In FIG. 1, the first attachment device 13 and the second attachment device 14 are provided as the attachment devices. The first attachment device 13 is for example, an ejector, and the second attachment device 14 is a lubricating device.

1-2. Control Panel

The control panel 20 includes a display unit 22 which displays a first image 40, a second image 70, and a third image 24, and an operation unit 60 which receives input operation. The first image 40 is a circular image which corresponds to the rotational motion of the eccentric mechanism 4 and represents one stroke of slide motion. One stroke corresponds to the movement of the slide 3 from the start of descending to the end of ascending, in which the slide 3 reciprocates only once. The second image 70 is a circular arc-like image corresponding to the operation of the first attachment device 13 interlocked with the press machine 1. The third image 24 is a circular image including a band-shaped region 30 for setting the velocity and motion of the slide 3. The control panel 20 is mounted to and electrically connected with the press machine 1. The control panel 20 is used by the operator who operates the press machine 1 to make various settings for the press machine 1 and operate the machine. When the operator inputs slide motion to the third image 24 from the operation unit 60, the operation is reflected in the slide operation region (a first slide operation region 41a, which will be described) in the first image 40. The operator can easily perform input operation since the operator can grasp the slide motion setting (the third image 24), the slide motion after the change (the first image 40), and the operation of the attachment device (the second image 70) at a glance at the display unit 22.

The display unit 22 is a liquid crystal display (LCD). Any of other known display devices (such as an organic electro luminescence (EL) display) may be used as the display unit 22. The display unit 22 can display various user interfaces (such as a graphical user interface (GUI)) for the operator.

The operation unit 60 is provided on the display unit 22. The operation unit 60 is a touch panel type section which is integrally provided with the display unit 22, and input operation to the operation unit 60 can be performed by touching operation. The operator can touch the operation unit 60 on the display unit 22 to change the displayed first image 40, the second image 70, and the third image 24, so that improved operability is provided. The operation unit 60 as the touch panel type section can be operated by directly touching the display unit 22 with a finger or a pen. The touch panel may be a known touch panel such as a resistive film type touch panel, a capacitive type touch panel, a surface capacitive type touch panel, or a projected capacitive type touch panel. The operation unit 60 is not limited to the touch panel integrated with the display unit 22 and may be a detachable panel from the display unit 22 or known input means (such as a mouse, a trackball, and a keyboard) provided separately from the display unit 22 if the operation unit can be operated to change the first image 40, the second image 70, the third image 24, and other images displayed at the display unit 22.

The control panel 20 includes a second operation unit 61 provided with physical buttons operated by the operator. The second operation unit 61 includes input means which can be operated instead of the touch panel type operation unit 60 and input means for operation that is different from the operation unit 60.

As illustrated in FIG. 2, the control panel 20 includes a calculation unit 62 and a storage unit 64 electrically connected to the display unit 22 and the operation unit 60.

The calculation unit 62 is a central processing unit (CPU) and performs press working processing by executing a program stored in the storage unit 64. When the press machine 1 is a servo press machine, the calculation unit 62 can set the motion of the slide 3 according to the operation of the operation unit 60 and the second operation unit 61 by the operator, and can change the motion of the slide 3 previously stored in the storage unit 64.

The storage unit 64 stores programs and setting data for the press machine 1, for example, motion data on the slide 3 when the press machine 1 is a servo press machine. The motion of the slide 3 can be represented by the motion curve of the slide 3 in one cycle, normally with the slide position (the stroke of the slide 3) (mm) on the axis of ordinate and the time (sec) of one cycle on the axis of abscissa. The calculation unit 62 outputs an instruction to the servo motor or the electric motor 7 in this case according to the motion data stored in the storage unit 64, and the servomotor is driven in response to the instruction to operate the slide 3 according to preset motion.

1-3. Display Unit

As illustrated in FIGS. 3 and 4, the control panel 20 has the display unit 22 and the operation unit 60 in the center of the front and the second operation unit 61 below the display unit 22. The display unit 22 displays the first image 40, the second image 70, 71, 72, and 73, and the third image 24. Multiple attachment device selection buttons 28 are displayed vertically on both sides of the first image 40 and the second images 70, 71, 72, and 73. The attachment device selection buttons 28 and the second images 70, 71, 72, and 73 correspond to timing switches (TSWs).

As illustrated in FIG. 3, the third image 24 is a circular image displayed on the upper side of the display unit 22 as the band-shaped region 30 and corresponding to the rotation movement of the eccentric mechanism 4. The range extending from the upper end 31 to the lower end 32 of the band-shaped region 30 corresponds to the moving range 10 in the linear motion of the slide 3. Therefore, the upper end 31 corresponds to the top dead center 17 of the crankshaft 5, and the lower end 32 corresponds to the bottom dead center 18 of the crankshaft 5 (FIG. 1). As the rotation angle of the crankshaft 5, "0°" is indicated at the upper end 31 of the band-shaped region 30, and "180°" is indicated at the lower end 32. Since the band-shaped region 30 is a circular image corresponding to the rotational motion of the eccentric mechanism 4, the operator can easily visually recognize the motion of the slide 3, so that the operability is improved. The width (thickness) of the band-shaped region 30 corresponds to the speed of the slide 3, and the maximum width W of the band-shaped region 30 represents the maximum speed of the slide 3. Here, the speed of the slide 3 refers to a target speed, and the control panel 20 instructs the motor 7 to move the slide 3 at the speed. The width of the band-shaped region 30 (the speed of the slide 3) can be changed by input operation to the operation unit 60. When the operator moves the fingers (pinches in) so that the width is narrowed in the direction of the arrow while touching the first slide operation region 41 or moves the finger (swipes) inwardly toward the inner periphery while touching the outer periphery of the first slide operation region 41, the maximum width W of the first slide operation region 41 is narrowed, and the operator pinches out or swipes reversely in order to return the width to the previous size.

When the press machine 1 is a servo press machine, as illustrated in FIG. 4, the band-shaped region 30 is formed in a circular shape by connecting multiple continuous slide operation regions (in FIG. 3, the first slide operation region 41, a second slide operation region 42, and a third slide operation region 43 during the forward rotation operation) in a direction in which the band-shaped region 30 extends. The maximum width W of the band-shaped region 30 can be changed for each of the slide operation regions (41, 42, 43), and the speed of the slide 3 to set varies depending on the widths. In this manner, the moving range 10 of the linear motion of the slide 3 and change in the speed of the slide 3 in each of the slide operation regions are expressed by the band-shaped region 30, and therefore the operator can set the motion while visually recognizing the motion of the slide 3 after setting. According to the embodiment, the band-shaped region 30 is divided into three, but the number of divisions is changed as appropriate depending on the motion of the slide 3 to be set.

The boundaries (a first boundary 51, a second boundary 52, and a third boundary 53) between adjacent slide operation regions (between the first and second slide operation regions 41 and 42, between the second and third slide operation regions 42 and 43, and between the third and first slide operation regions 43 and 41) can be moved in the direction in which the band-shaped region 30 extends in response to input operation to the operation unit 60. The speed of slide 3 can be set for each of the slide operation regions (41, 42, and 43), and the boundaries (51, 52, 53) among the slide operation regions (41, 42, and 43) can be moved, so that when the press machine 1 is a servo press machine, the operator can perform input operation while visually recognizing the motion of the slide 3, and the operability can be improved.

The band-shaped region 30 may be in any form (such as a vertically or horizontally extending linear shape, a V shape, and a U shape) other than the circular shape.

The display unit 22 may display an image other than the band-shaped region 30. For example, a button for operation may be represented as an image.

2. First Image

Figure 5:
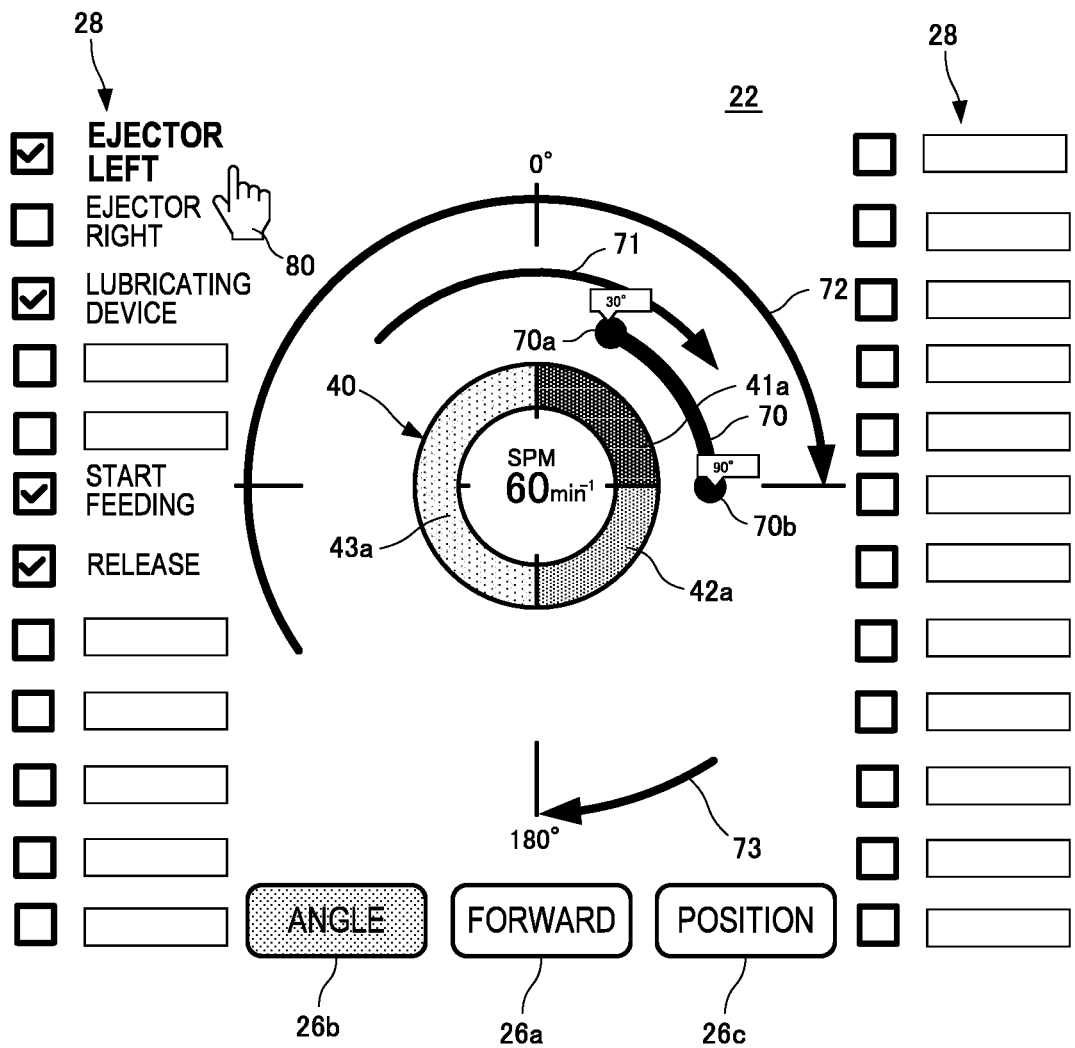
FIG. 5 illustrates first and second images displayed at a display unit when the press machine according to the embodiment is a servo press machine.

With reference to FIGS. 3, 4, and 5, the first image 40 will be described. FIG. 5 illustrates the first image 40 and the second images 70, 71, 72, and 73 displayed at the display unit 22 when the press machine 1 according to the embodiment is a servo press machine.

As illustrated in FIGS. 3 and 4, both the third image 24 and the first image 40 displayed above and below the display unit 22 are circular images corresponding to the rotation movement of the eccentric mechanism 4. A "circular" image needs only be an image including at least an arc which allows the operator to recognize as the rotation movement of eccentric mechanism 4, and the image may be in any shape other the circular shape such as an elliptical shape, a semicircular shape, a sector, a circular arc, and an annular shape.

At least one slide operation region is indicated at the first image 40. The first slide operation region 41a corresponding to the first slide operation region 41 of the third image 24 is indicated at the first image 40 in FIG. 3.

The first slide operation region 41a, the second slide operation region 42a, and the third slide operation region 43a corresponding to the first slide operation region 41, the second slide operation region 42, and the third slide operation region 43 of the third image 24 are displayed at the first image 40 in FIG. 4. The first image 40 is similar shape to the third image 24 and is smaller than the third image 24. In FIG. 4, when the operator inputs slide motion from the operation unit 60 to the third image 24, the operation is reflected on the slide operation region of the first image 40. For example, when the operator lowers the first boundary 51 of the first slide operation region 41 downward, the angle of the first slide operation region 41a in the first image 40 is also changed to the same angle.

3. Second Image

Figure 6:
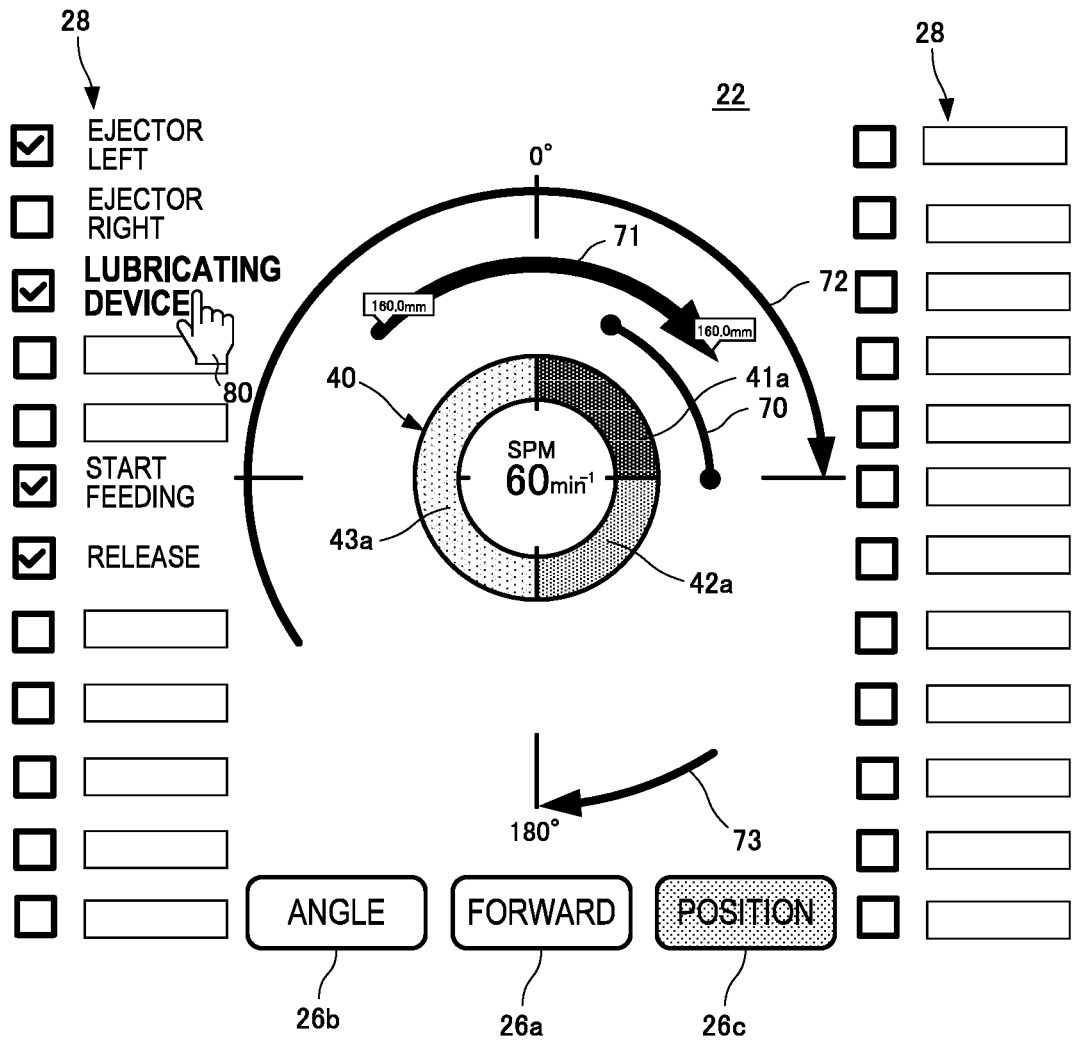
FIG. 6 illustrates first and second images displayed at the display unit when the press machine according to the embodiment is a servo press machine.
Figure 7:
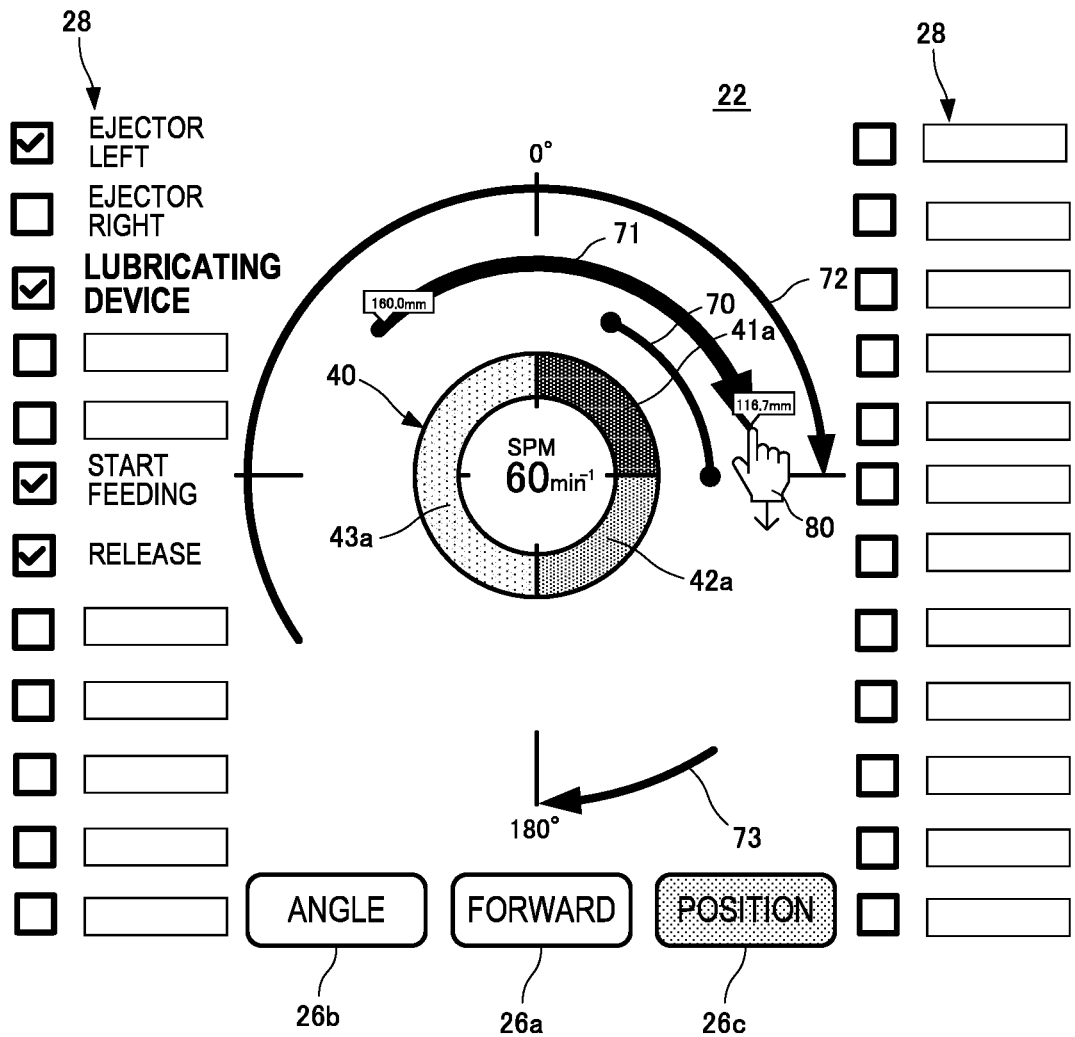
FIG. 7 illustrates first and second images displayed at the display unit when the press machine according to the embodiment is a servo press machine.
Figure 8:
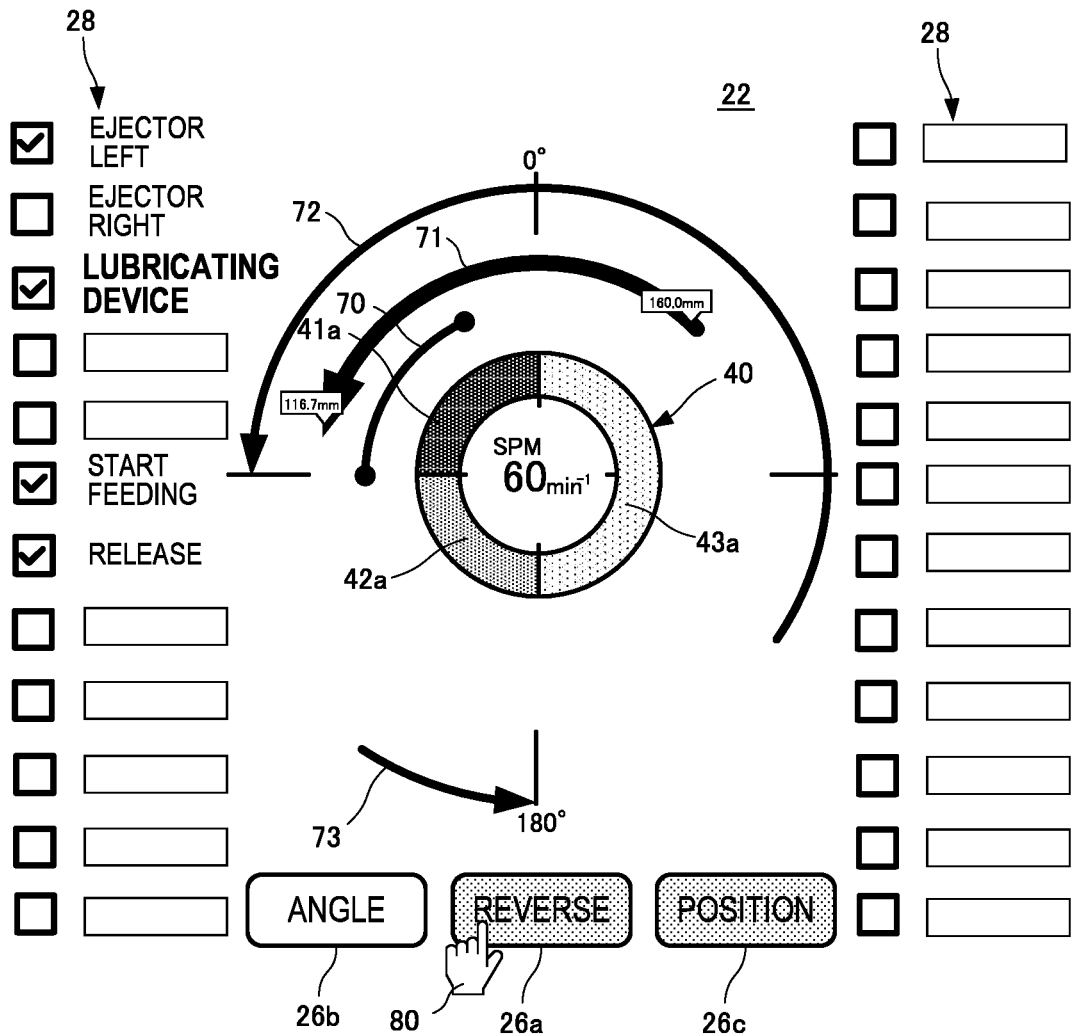
FIG. 8 illustrates first and second images displayed at the display unit when the press machine according to the embodiment is a servo press machine.

With reference to FIGS. 5 to 8, the second images 70, 71, 72, and 73 will be described. FIGS. 5 to 8 illustrate the first image 40 and the second images 70, 71, 72, and 73 displayed at the display unit 22 when the press machine 1 according to the embodiment is a servo press machine. When the press machine 1 according to the embodiment is not a servo press machine, the method of inputting and displaying the second images 70, 71, 72, and 73 is the same as that for the servo press machine, but only the first slide operation region 41a is displayed in the first image 40. The reverse operation illustrated in FIG. 8 is not performed as steady-state operation.

The display unit 22 illustrated in FIGS. 5 to 8 displays the multiple second images 70, 71, 72, and 73 concentrically with the first image 40. Although FIGS. 5 to 8 illustrate examples in which the multiple second images 70, 71, 72, 73 are provided outside the first image 40, the images may be provided inside or on the inner side of the first image 40. The multiple second images 70, 71, 72, and 73 respectively correspond to different operations in the same or different attachment devices. The second image 70 is a circular arc image corresponding to the operation of a left ejector as the first attachment device 13 interlocked with the press machine 1. The second image 71 is a circular arc image corresponding to the operation of a lubricating device as the second attachment device 14 interlocked with the press machine 1. The second image 72 is a circular arc image corresponding to the feeding operation of the feed device as the third attachment device interlocked with the press machine 1. The second image 73 is a circular arc image corresponding to the releasing operation of the feed device as the third attachment device interlocked with the press machine 1. The manner of display allows the operator to easily set multiple operations of the attachment device while visually recognizing the relation between the slide motion and the multiple operations of the attachment device. Furthermore, the colors of the different attachment device selection buttons 28 are made different from one another, and each of the attachment device selection buttons 28 and the corresponding second images 70, 71, 72, 73 may be displayed in the same color, the multiple operations of the attachment device can be set more easily.

The second images 70, 71, 72, and 73 are each provided in connection with a slide operation region of the first image 40. The circumference of the second images 70, 71, 72, and 73 corresponds to one circumference of the eccentric mechanism 4.

FIG. 5 indicates that an angle selection button 26b is pressed (tapped) and "angles" displayed at opposed ends of the second image 70 have been selected. The second image 70 is innermost among the four second images 70, 71, 72, and 73, indicating the operation from the start (i.e., when the eccentric mechanism 4 is in the position of 30°) to the end (i.e., when the eccentric mechanism 4 is in the position of) 90° of the first slide operation region 41a.

In FIG. 5, the operator moves the finger 80 onto the "left ejector" button among the attachment device selection buttons 28 and selects (taps) the ejector. In this way, the "left ejector" among the attachment device selection buttons 28 is displayed thicker than the other attachment device selection buttons 28, and the second image 70, which indicates the operation range of the left ejector, is more highlighted and displayed thicker than the second images 71, 72, and 73, which indicate the operation range of the other attachment devices. This allows the operator to recognize that the second image 70 corresponding to the "left ejector" among the attachment device selection buttons 28 is selected and to operate the second image 70. Here, the left ejector starts operation, for example, air blowing from a position in which the rotation of the eccentric mechanism 4 is 30°, and stops air blowing in a position in which the rotation of the eccentric mechanism 4 is 90°.

In FIG. 6, a position selection button 26c is pressed to indicate that the "positions" of opposed ends of the second image 71 are displayed. The "position" is a relative position (the height from the bottom dead center position) (mm) with respect to 0 (mm) when the slide 3 is at the bottom dead center (180°). The operator moves the finger 80 over the "lubricating device" button and selects the button. Therefore, the "lubricating device" among the attachment device selection buttons 28 is displayed thicker than the other attachment device selection buttons 28, and the second image 71 of the lubricating device is highlighted and displayed thick.

The second images 71, 72, and 73 are each displayed in the shape of an arrow from the start to the end. The arrows indicate the same rotation direction as the rotation direction of the eccentric mechanism 4 in the first image 40. Although the actual slide 3 moves up and down, the "rotation direction of the eccentric mechanism 4" matches the moving direction of the slide 3 the operator assumes, which is easy for the operator to understand. In FIG. 6, the forward/reverse selection button 26a is pressed to select the "forward direction," so that each arrow is in the forward direction. Using he second images 71, 72, and 73 each in the shape of arrow, the operation of the attachment device can be easily set while the operator easily recognizes the operation direction of the slide 3.

The ends of each of the second images 70, 71, 72, and 73 can be moved in the direction in which the second images 70, 71, 72, and 73 each extend in response to input operation. The extending direction is along a concentric circle having the same radius as that of each of the second images 70, 71, 72, and 73.

In FIG. 7, the operation end position of the lubricating device is changed from 160.0 mm (FIG. 6) to 116.7 mm when the operator drags clockwise along a concentric circle having the same radius while touching the tip end of the second image 71 with the finger 80. Using for example the circular first image 40 and the circular arc second image 71, the operation of the attachment device can be easily set while visually recognizing the relation between the slide motion and the operation of the attachment device or the like.

In FIG. 8, the forward/reverse selection button 26a is pressed, and the first image 40 and the second images 70, 71, 72, and 73 are displayed in the operation to the reverse direction (FIG. 8) from the forward and reverse (FIG. 7). The slide operation regions (41a, 42a, and 43a) of the first image 40 representing one stroke of the slide motion are inverted at the vertical lines indicating 0° and 180°, and the arrows of the second images 71, 72, and 73 are all in the reverse direction. Since the forward/reverse rotation of the eccentric mechanism 4 can be displayed by the forward/reverse selection button 26a, the operator can easily visually recognize each operation of the attachment device when the press machine 1 is a servo press machine and makes pendulum motion.

4. Display of Advance Angle

Figure 11:
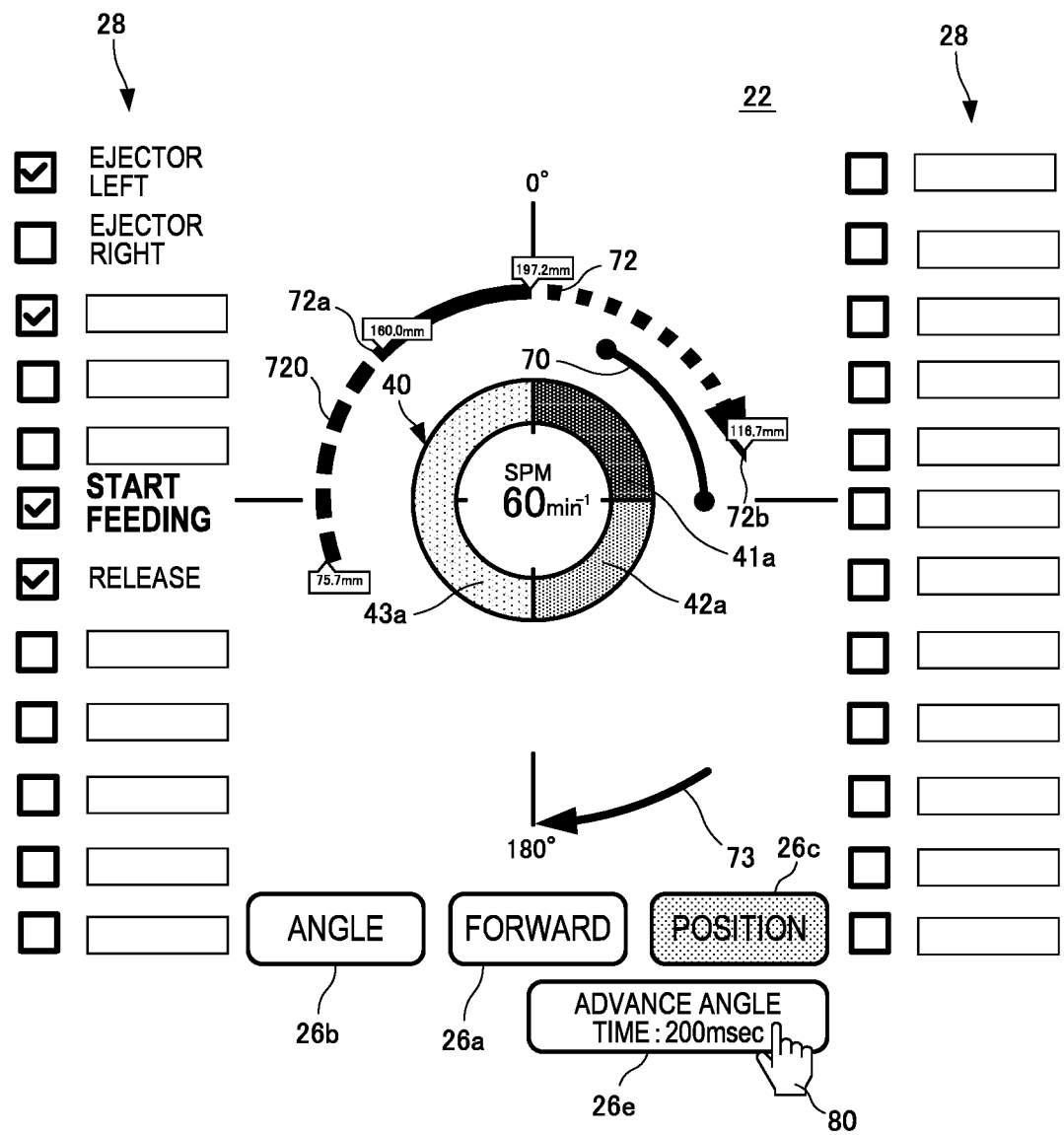
FIG. 11 illustrates the operation of setting an advance angle based on time using the second image displayed at the display unit when the press machine according to the embodiment is a servo press machine.
Figure 12:
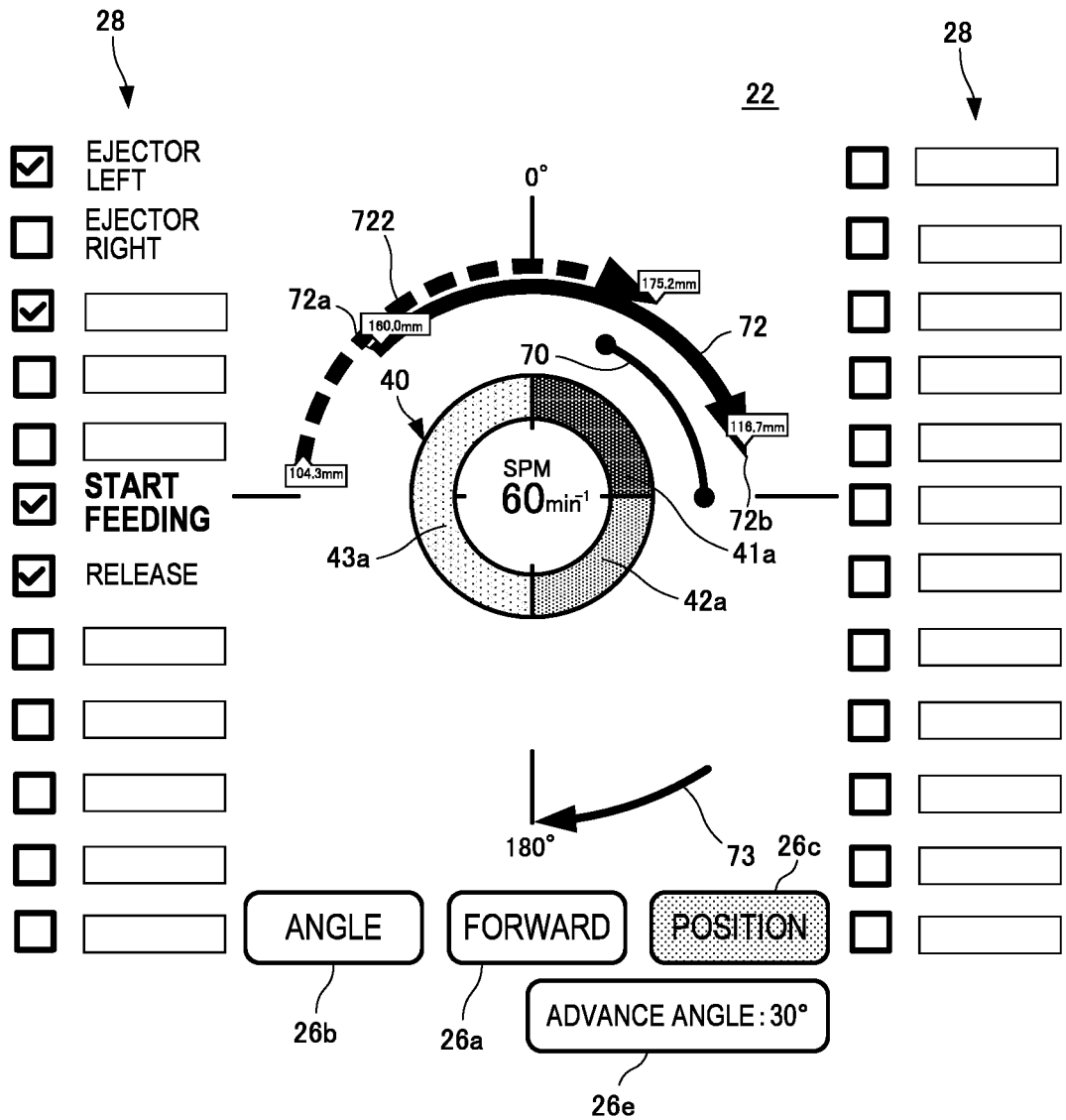
FIG. 12 illustrates the operation of setting am advance angle using the second image displayed at the display unit when the press machine according to the embodiment is a servo press machine.
Figure 13:
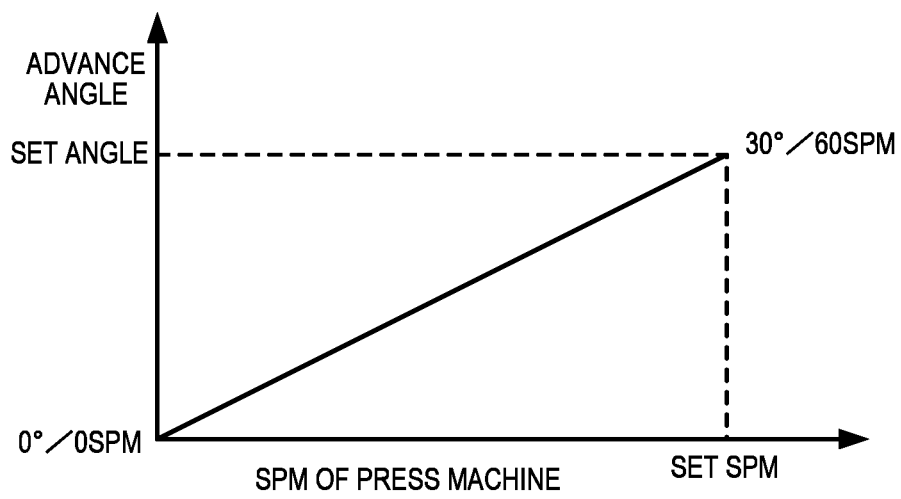
FIG. 13 is a graph illustrating the relation between the SPM and the advance angle of the press machine according to the embodiment.

With reference to FIGS. 9 to 13, the operation of setting an advance angle will be described. FIGS. 9 to 12 illustrate the operation of setting an advance angle (relative to the operation timing of the attachment device) by the second images 70, 71, 72, and 73 displayed in the display unit 22 when the press machine 1 is a servo press according to the embodiment, and FIG. 13 is a graph illustrating the relation between the strokes per minute (SPM) of the press machine land the advance angle. Note that when the press machine 1 is not a servo press machine, the methods for setting and displaying the advance angle are the same as those for a servo press machine, but only the first slide operation region 41a as illustrated in FIG. 3 is displayed at the first image 40.

As illustrated in FIGS. 9 to 12, the display unit 22 displays a fourth image 720 representing an operation range according to the advance angle at the starting end 72a of the second image 72.

The advance angle is a correction angle which is generally set to compensate for an operation time delay by an attachment device operated by output from the press machine 1 and keep the attachment device to operate at a constant angle. The angle in this case refers to the rotation angle of the eccentric mechanism 4. Correction based on advance angles is disclosed in JP-B-7-29224.

Figure 9:
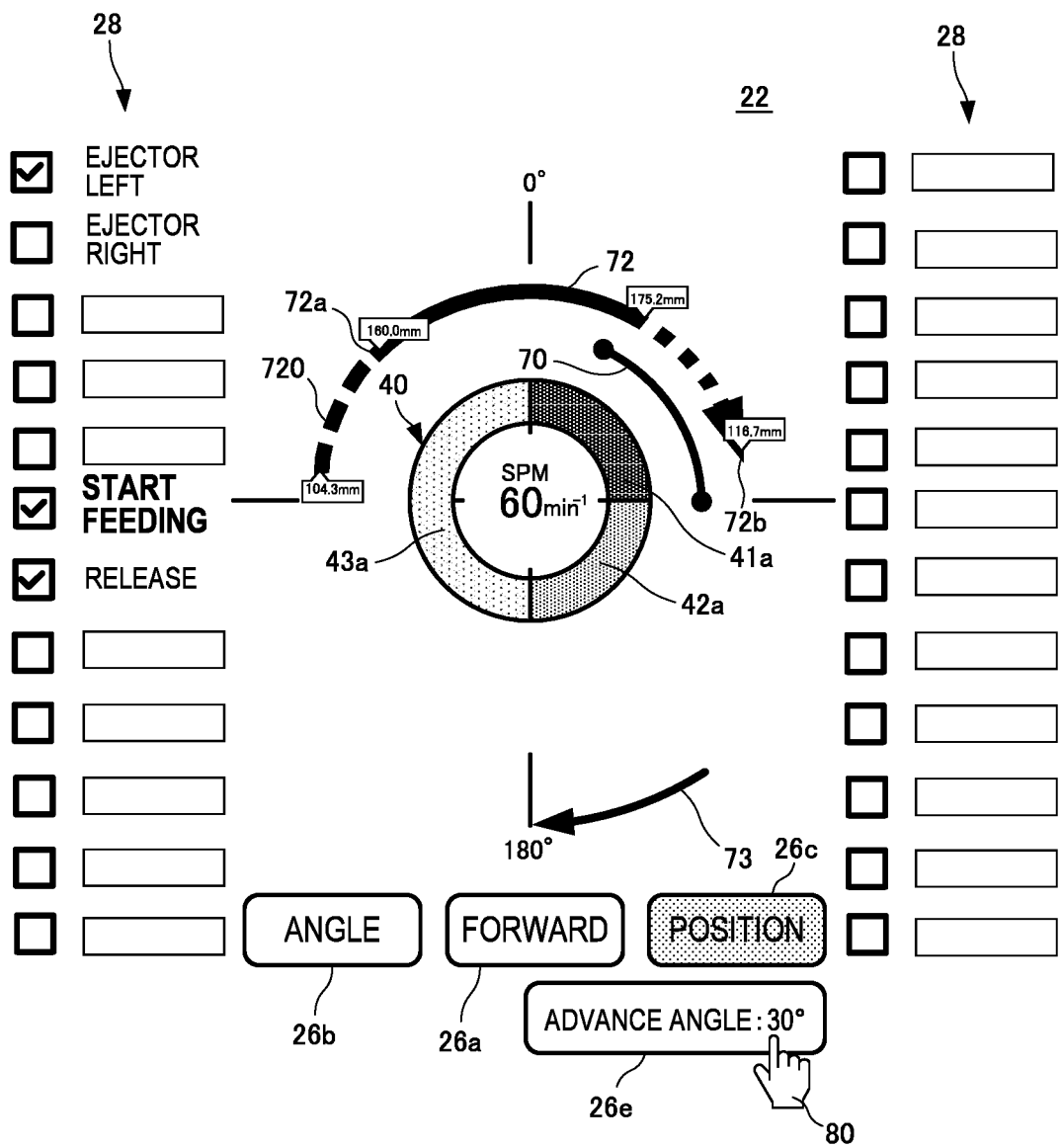
FIG. 9 illustrates the operation of setting an advance angle using the second image displayed at the display unit when the press machine according to the embodiment is a servo press machine.

In FIG. 9, the "start feeding" button is selected among the attachment device selection buttons 28, and the "start feeding" as the attachment device selection button 28 is displayed thicker than the other attachment device selection buttons 28, and the second image 72 for the "start feeding" is highlighted. As the operator moves the finger 80 onto the advance angle setting button 26e and selects the button, the fourth image 720 is displayed as a dashed line which extends from the starting end 72a of the second image 72. The operator attempts to set an actual operation starting position for the feeding device as the attachment device to the position where the height of the slide 3 at the starting end 72a is 160.0 mm. However, an operation time delay exists as an eigenvalue until the feeding actually starts after the slide 3 reaches the position as high as 160.0 mm and a control signal from the press machine 1 is output to the feeding device in response. Since the eigenvalue is proportional to the rotational speed of the eccentric mechanism 4, the advance angle of the press machine 1 corresponding to the rotational speed of the eccentric mechanism 4 is also proportional to the SPM as illustrated in FIG. 13. Here, since the operator sets the advance angle to 30° at the display unit 22, the correction value when the SPM (the number of strokes per minute) is 60 min$^{-1}$ is calculated by the calculation unit 62 (FIG. 2), and the display unit 22 displays the operation range by the "advance angle: 30°" by dashed lines as the fourth image 720.

The fourth image 720 is on a concentric circle with the same radius as the second image 72, so that the operator can visually recognize output of a control signal for starting feeding in an earlier stage (when the height of the slide 3 is 104.3 mm) than the starting end 72a. The operator would not easily grasp the advance angle as a setting, the operation of the attachment device may be set while the operator visually recognize the rotation operation of the eccentric mechanism 4 as well as the second image 72 in this manner, so that the operability is improved for the operator. The improved operability also leads to increased productivity.

Since the operation is also delayed at the terminal end 72b of the second image 72, output of the control signal to the feeding device is stopped when the slide 3 is as high as 175.2 mm as the advance angle is set, and a control signal is no longer output in the range denoted by the dashed lines, while the feeding device actually operates until the height is 116.7 mm.

Figure 10:
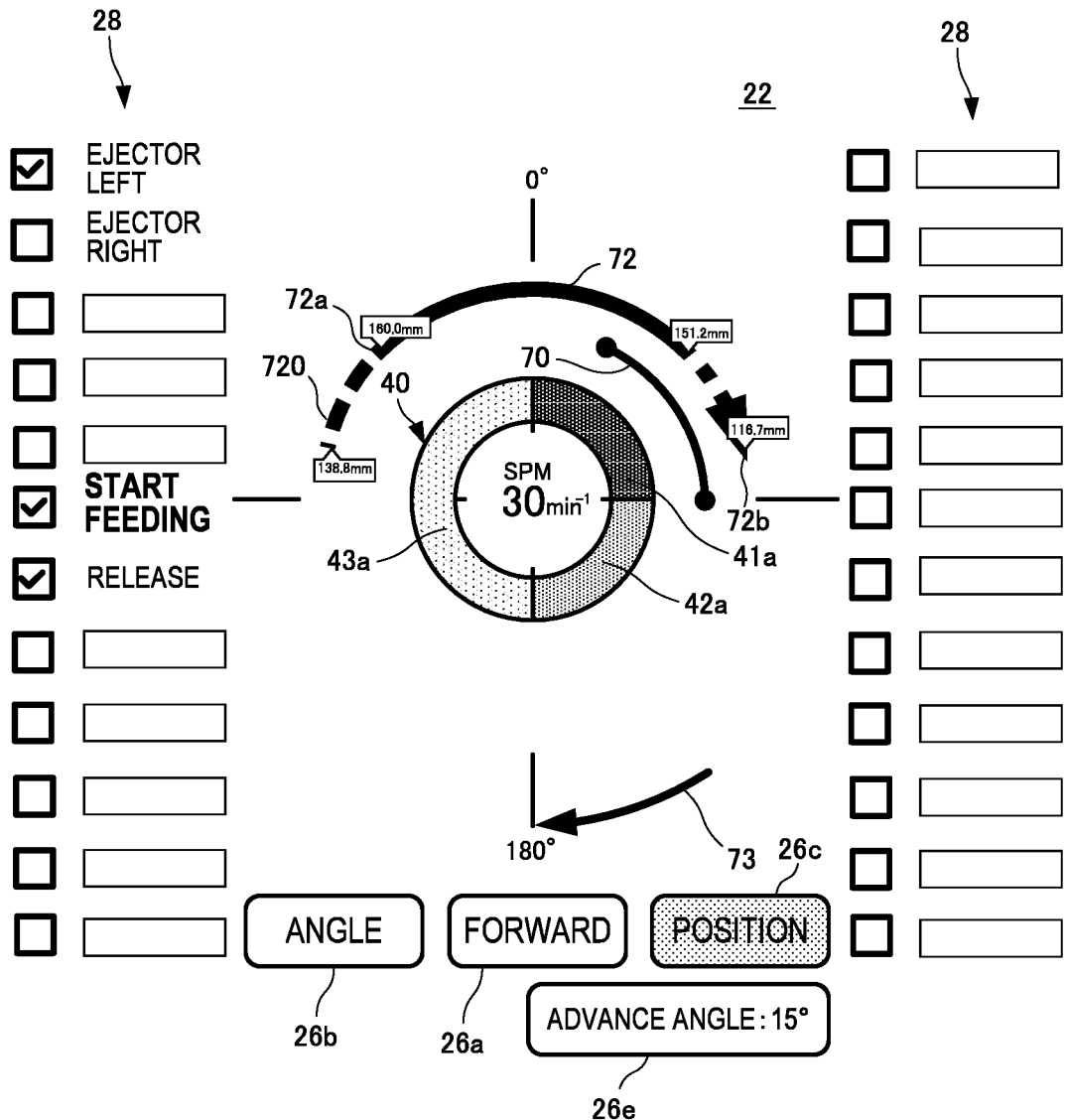
FIG. 10 illustrates the operation of setting an advance angle using the second image displayed at the display unit when the press machine according to the embodiment is a servo press machine.

In FIG. 10, the operator has changed the SPM from 60 min$^{-1}$ to 30 min$^{-1}$ when the operation timing of the attachment device does not change, for example, when the same product is produced. As described above, the rotational speed and the advance angle of the eccentric mechanism 4 are in a proportional relation. The calculation unit 62 automatically recalculates the correction value for an advance angle of 15° which is ½ of the previous angle since the SPM has been changed to ½ of the previous value. As a result, the value of the advance angle at the advance angle setting button 26e is changed to 15°, the dashed line of the fourth image 720 is displayed shorter than that in FIG. 9 and starts from the position where the height of the slide 3 is 138.8 mm. As described above, when the operation timing of the attachment device does not change, the operator does not have to change a set advance angle according the SPM when the SPM is arbitrarily changed, so that the operability is improved.

In FIG. 11, the advance angle is set and displayed in terms of advance angle time. The advance angle time is time corresponding to an advance angle, and an eigenvalue as an operation delay is expressed in time instead of angle. According to the present application, the advance angle time is one mode of the advance angle.

FIG. 12 shows another example of displaying an advance angle at the display unit 22. The display unit 22 displays a fifth image 722 representing an operation range by the advance angle side by side with the second image 72. The fifth image 722 is displayed by a dashed line on the same concentric circle outside the second image 72. As can be clearly understood from the fifth image 722, the feeding device starts feeding from 104.3 mm and a control signal for starting feeding ends at 175.2 mm based on the advance angle setting. The operation of starting feeding is set by the operator so that the operation starts from 160.0 mm as shown in the second image 72 and ends at 116.7 mm, and therefore the operator can visually recognize that the control signal is output in consideration of the operation delay depending on the advance angle.

5. Pendulum Motion

Figure 14:
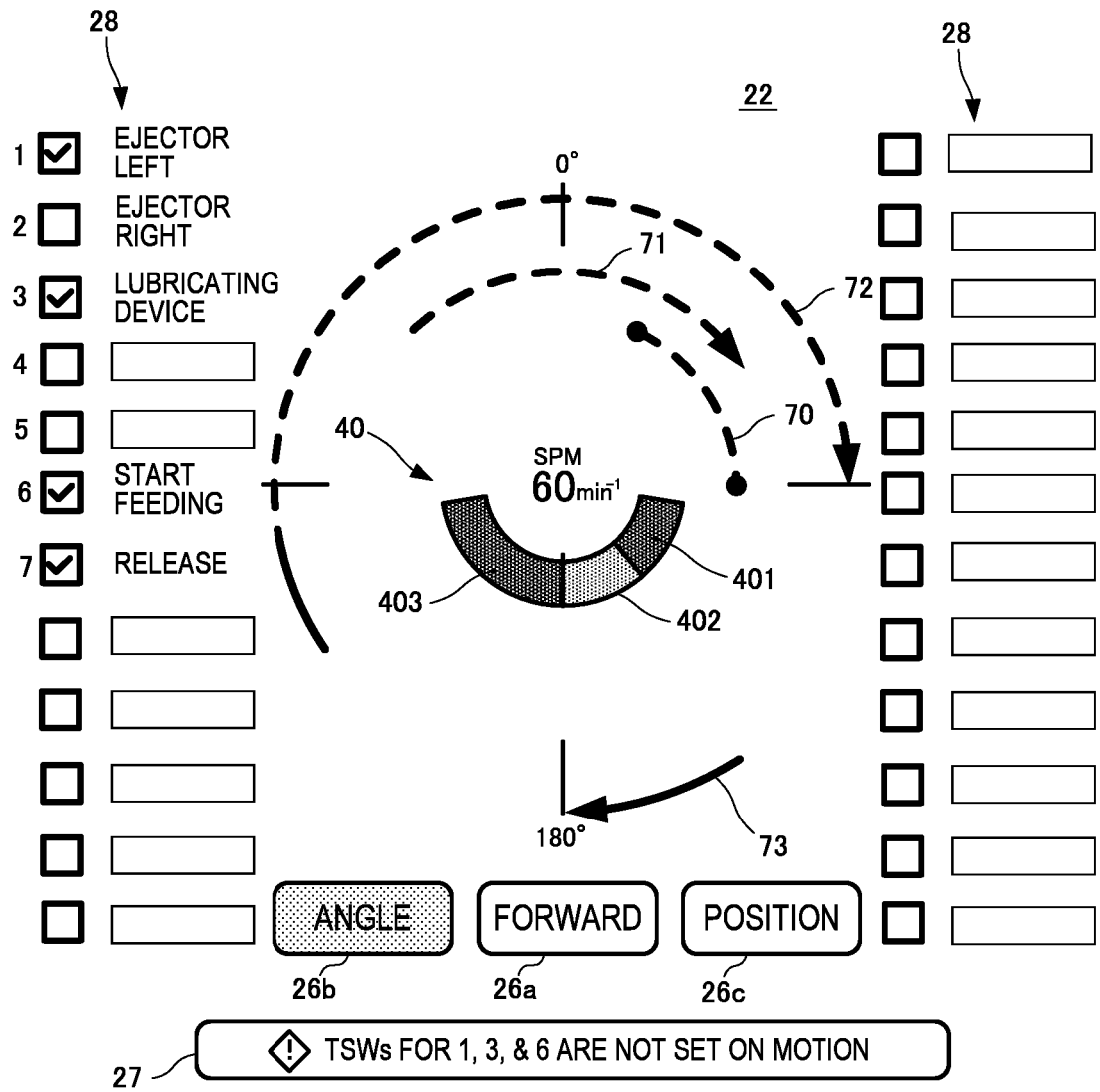
FIG. 14 illustrates first and second images displayed at the display unit when the press machine according to the embodiment is a servo press machine.
Figure 15:
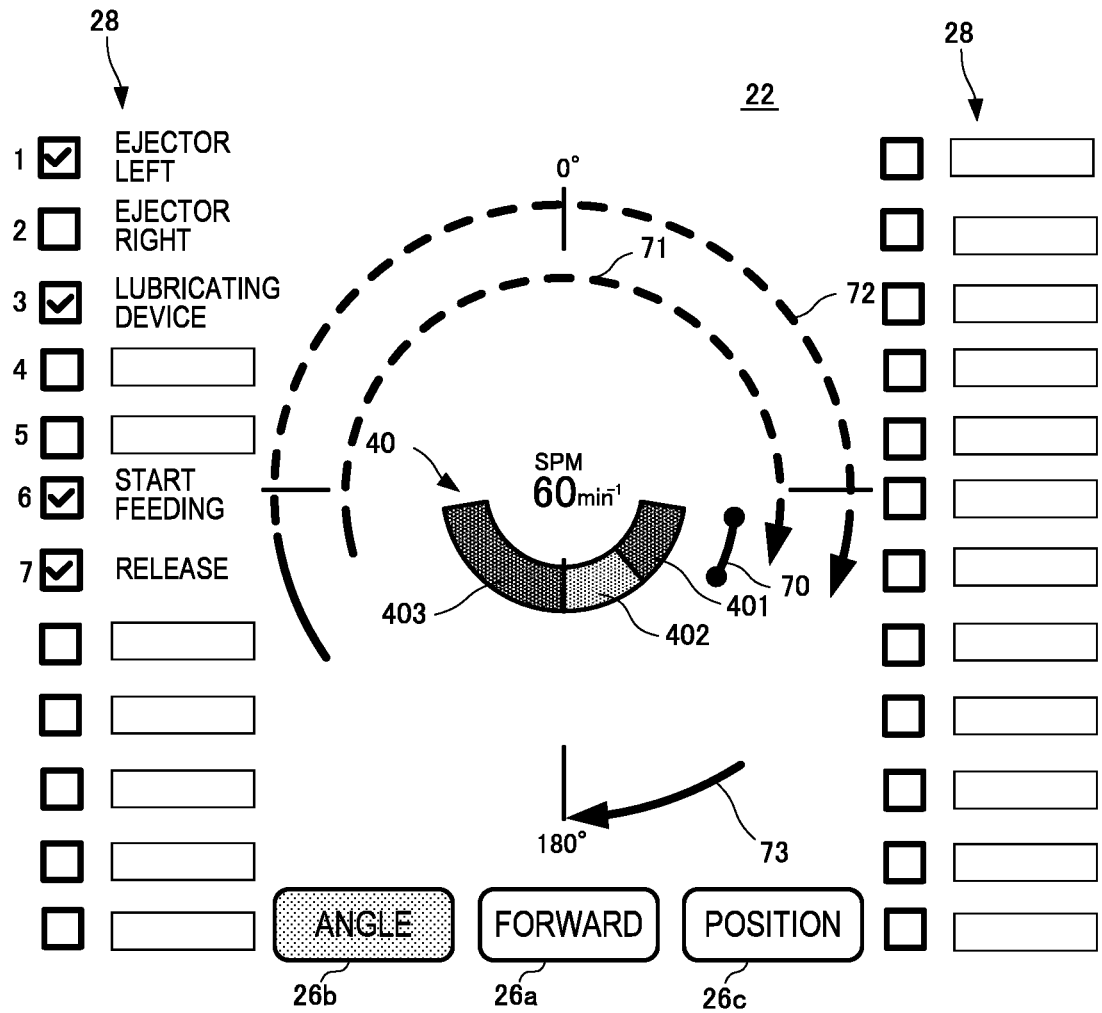
FIG. 15 illustrates first and second images displayed at the display unit when the press machine according to the embodiment is a servo press machine.

With reference to FIGS. 14 and 15, the first image 40 and the second image 70 for the pendulum motion of the slide 3 when the press machine 1 is a servo press machine will be described.

As illustrated in FIG. 14, pendulum motion is reciprocating motion which does not return to the top dead center (0°), so that the first image 40 can be represented in a sector shape. The first image 40 includes, for example, a first slide operation region 401, a second slide operation region 402, and a third slide operation region 403 as a pendulum slide operation region corresponding to the pendulum motion of the eccentric mechanism 4. FIG. 14 shows pendulum motion in forward motion, and when the forward/reverse selection button 26a is pressed to reverse the motion, the second slide operation region 402 is displayed at the left side of the bottom dead center (180°).

As illustrated in FIG. 14, when at least one of the ends of each of the second images 70, 71, and 72 is set in a region other than the pendulum slide operation region, the display unit 22 displays that the attachment device corresponding to the second images 70, 71, and 72 is in an erroneous state. In FIG. 14, the operation start position and the operation end position of the second images 70 and 71 are set in a range other than the pendulum slide operation region in which the slide 3 does not operate (the regions other than the first slide operation region 401, the second slide operation region 402, and the third slide operation region 403). The operation end position of the second image 72 is set to a region other than the pendulum slide operation region. The part of the second images 70, 71, and 72 set in the region in which the slide 3 does not operate is indicated, for example, by a dashed line. Therefore, the second images 70 and 71 are entirely displayed by dashed lines, and the second image 72 is shown by dashed lines except for the vicinity of the operation starting position. An error indication 27 is displayed at the lower part of the display unit 22 for 1, 3, and 6 representing the attachment device selection buttons 28 corresponding to the second images 70, 71, and 72. When the operating range of an attachment device is set in the range where the slide 3 does not operate, the operator needs only look at the display unit 22 to know that the setting for the attachment device is in an error state.

When the operator operates (drags) the starting end or/and the terminal end of the second image 70, 71, or 72 downwardly in response to the error indication 27 to change the operation starting position and the operation ending position of the second image 70, 71, or 72 to within the range in which the slide 3 operates as illustrated in FIG. 15, the error indication 27 disappears and the setting is completed.

6. Method of Setting Operation for Press Machine

With reference to FIGS. 1 to 15, the method of setting an operation for the press machine 1 will be described.

By the method according to this embodiment, the operation of the press machine 1 is set using the control panel 20 of the press machine 1. The operator of the press machine 1 performs input operation to the third image 24, the first image 40, and the second images 70, 71, 72, and 73 displayed at the display unit 22 of the control panel 20.

As input operation, the operator may tap, pinch in, pinch out, swipe, and drag similarly to the operation method used for a smartphone while contacting the finger 80 on the touch panel type operation unit 60 on the display unit 22. Input operation may be carried out using the second operation unit 61 described above or any other known device. For example, the operation may be input for example by a keyboard image or by clicking, dragging, and dropping the cursor displayed at the display unit 22 using a mouse device with respect to the third image 24, the first image 40, and the second image 70, 71, 72, and 73.

When the speed of the slide 3 provided in the band-shaped region 30 of the third image 24 can be set by the operator's input operation and the press machine 1 is a servo press machine, the boundaries (51, 52, and 53) for example among the multiple slide operation regions (41, 42, and 43) are moved to set respective height ranges for the slide 3 for the slide operation regions (41, 42, and 43) in which the slide operates at respective speeds. The boundaries (51, 52, and 53) for example among the slide operation regions (41, 42, and 43) for which respective speeds for the slide 3 are set are moved, so that the height ranges for the slide 3 corresponding to the slide operation regions (41, 42, and 43) in which respective speeds for the slide 3 are set, and therefore the operator can set the motion while visually recognizing the motion of the slide 3 after setting.

When the third image 24 is changed in response to the operator's input operation, the display of the first image 40 is also changed according to the third image 24.

Furthermore, the operator carries out the input operation to the second images 70, 71, 72, and 73, so that the operation range for an attachment device which interacts with the press machine 1 can be set. The operator selects the attachment device desired to be changed in the setting among the attachment device selection buttons 28. Then, the operator can set an operation range for the left ejector for example by moving the starting end 70a and the terminal end 70b of the second image 70 corresponding to the selected attachment device in the direction in which the second image 70 extends.

In this way, according to the method of setting an operation for the press machine 1, the operation of the attachment device can be easily set while visually recognizing the relation between the slide motion and the operation of the attachment device using the circular shaped, first image 40 and the circular arc shaped, second images 70, 71, 72, and 73.

The operations described above for the press machine 1 may be applied to the method.

The invention is not limited by the embodiments described above and may further be modified in various forms. The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A press machine performing press working by transforming a rotation of an electric motor into a reciprocating linear motion of a slide by using an eccentric mechanism which transforms a rotational motion into a linear motion, the press machine comprising:
   a display which displays a first image in a circular shape corresponding to a rotation of the eccentric mechanism and representing one stroke of slide operation and a second image in a circular-arc shape corresponding to an operation of an attachment interlocked with the press machine; and
   a touch panel type user interface which is integrated with the display and receives an input operation formed by touching operation,
   the first image indicating at least one slide operation region,
   the second image being placed concentrically with the first image in relation to the at least one slide operation region, and
   the second image having opposed ends each allowed to move in response to the input operation in a direction in which the second image extends.

2. The press machine according to claim 1, wherein the display displays a plurality of the second images arranged concentrically with the first image, and each of the plurality of second images correspond to other operations of the attachment or another attachment.

3. The press machine according to claim 2, wherein the second image is displayed in an arrow shape directed from a starting end to a terminal end, and the arrow indicates a rotation direction which is identical to a direction in which the eccentric mechanism rotates in the first image.

4. The press machine according to claim 3, wherein the display further displays a third image in a circular shape, and the press machine is a servo press machine, a slide motion is input from the touch panel type user interface to the third image, so that the slide motion is reflected on the at least one slide operation region in the first image.

5. The press machine according to claim 3, wherein
the display displays a fourth image representing an operation range by an advance angle at the starting end of the second image and
the advance angle is a correction angle which is set to compensate for an operation time delay by the attachment operated by an output from the press machine and keep the attachment to operate at a constant angle.

6. The press machine according to claim 3, wherein
the display displays a fifth image representing an operation range by an advance angle side by side with the second image.

7. The press machine according to claim 3, wherein
the press machine is a servo press machine,
the first image includes a pendulum slide operation region corresponding to a pendulum motion of the eccentric mechanism, and
in response to at least one of the opposed ends of the second image being set in a region other than the pendulum slide operation region, the display indicates that the attachment corresponding to the second image is in an erroneous state.

8. The press machine according to claim 2, wherein
the display further displays a third image in a circular shape, and
the press machine is a servo press machine,
a slide motion is input from the touch panel type user interface to the third image, so that the slide motion is reflected on the at least one slide operation region in the first image.

9. The press machine according to claim 2, wherein
the display displays a fourth image representing an operation range by an advance angle at a starting end of the second image and
the advance angle is a correction angle which is set to compensate for an operation time delay by the attachment operated by an output from the press machine and keep the attachment to operate at a constant angle.

10. The press machine according to claim 2, wherein
the display displays a fifth image representing an operation range by an advance angle side by side with the second image.

11. The press machine according to claim 2, wherein
the press machine is a servo press machine,
the first image includes a pendulum slide operation region corresponding to a pendulum motion of the eccentric mechanism, and
in response to at least one of the opposed ends of the second image being set in a region other than the pendulum slide operation region, the display indicates that the attachment corresponding to the second image is in an erroneous state.

12. The press machine according to claim 1, wherein
the second image is displayed in an arrow shape directed from a starting end to a terminal end, and
the arrow indicates a rotation direction which is identical to a direction in which the eccentric mechanism rotates in the first image.

13. The press machine according to claim 12, wherein
the display further displays a third image in a circular shape, and
the press machine is a servo press machine,
a slide motion is input from the touch panel type user interface to the third image, so that the slide motion is reflected on the at least one slide operation region in the first image.

14. The press machine according to claim 12, wherein
the display displays a fourth image representing an operation range by an advance angle at the starting end of the second image and
the advance angle is a correction angle which is set to compensate for an operation time delay by the attachment operated by an output from the press machine and keep the attachment to operate at a constant angle.

15. The press machine according to claim 12, wherein
the display displays a fifth image representing an operation range by an advance angle side by side with the second image.

16. The press machine according to claim 12, wherein
the press machine is a servo press machine,
the first image includes a pendulum slide operation region corresponding to a pendulum motion of the eccentric mechanism, and
in response to at least one of the opposed ends of the second image being set in a region other than the pendulum slide operation region, the display indicates that the attachment corresponding to the second image is in an erroneous state.

17. The press machine according to claim 1, wherein
the display further displays a third image in a circular shape, and
the press machine is a servo press machine,
a slide motion is input from the touch panel type user interface to the third image, so that the slide motion is reflected on the at least one slide operation region in the first image.

18. The press machine according to claim 1, wherein
the display displays a fourth image representing an operation range by an advance angle at a starting end of the second image, and
the advance angle is a correction angle which is set to compensate for an operation time delay by the attachment operated by an output from the press machine and keep the attachment to operate at a constant angle.

19. The press machine according to claim 1, wherein
the display displays a fifth image representing an operation range by an advance angle side by side with the second image.

20. The press machine according to claim 1, wherein
the press machine is a servo press machine,
the first image includes a pendulum slide operation region corresponding to a pendulum motion of the eccentric mechanism, and
in response to at least one of the opposed ends of the second image being set in a region other than the pendulum slide operation region, the display indicates that the attachment corresponding to the second image is in an erroneous state.

21. A method of setting an operation for a press machine which performs press working by transforming a rotation of an electric motor into a reciprocating linear motion of a slide by using an eccentric mechanism which transforms a rotational motion into a linear motion, the method comprising:
displaying a first image in a circular shape corresponding to a rotation of the eccentric mechanism displayed at a display and representing one stroke of slide operation and a second image in a circular-arc shape placed concentrically with the first image; and
setting a range in which an attachment interlocked with the press machine operates by performing an input operation to the second image by touching operation from a touch panel type user interface which is integrated with the display.

* * * * *